United States Patent
Bartolozzi et al.

[11] Patent Number: 6,022,284
[45] Date of Patent: Feb. 8, 2000

[54] APPARATUS FOR CHANGING GEAR RATIO IN BICYCLES, ESPECIALLY IN RACE BICYCLES

[76] Inventors: Attilio Bartolozzi; Andrea Bartolozzi, both of Via Romana 46, 50052, Certaldo, Italy

[21] Appl. No.: 09/149,833

[22] Filed: Sep. 8, 1998

[30] Foreign Application Priority Data

Mar. 26, 1998 [IT] Italy .................................. FI98A0071

[51] Int. Cl.[7] .................................. F16H 9/00; F16H 7/22
[52] U.S. Cl. .................................. 474/80; 474/83; 474/122
[58] Field of Search .................................. 474/78, 80, 120, 474/122, 127, 128, 129, 83

[56] References Cited

U.S. PATENT DOCUMENTS

| | | | |
|---|---|---|---|
| 5,358,451 | 10/1994 | Lacombe et al. | 474/80 |
| 5,466,194 | 11/1995 | Steinberg et al. | 474/80 |
| 5,618,241 | 4/1997 | Ose | 474/80 |
| 5,876,296 | 3/1999 | Hsu et al. | 474/80 |

*Primary Examiner*—Tamara L. Graysay
*Assistant Examiner*—Matthew A. Kaness
*Attorney, Agent, or Firm*—McGlew and Tuttle, P.C.

[57] ABSTRACT

Apparatus for changing bicycle gear ratios comprising pedals (1) to the shaft (3) of which a group of coaxial overdrive gears is fixed, with at least an overdrive gear (20) of larger diameter and at least an overdrive gear (2) of smaller diameter; a plurality of sprockets (4) of different diameter, pack-like disposed close to each other and mounted on the shaft (40) of the rear wheel; a roller chain for the transmission of motion from one of the overdrive gears (2; 20) to one of the sprockets (4); a mechanism for shifting the chain (5) from one to another of said sprockets (4), with a cyclist-operated lever-and-wire driving mechanism; and a mechanism for guiding the deviation of the chain (5) from one to the other of the overdrive gears (2; 20) in cooperation with the mechanism for shifting the chain (5) over the sprockets (4) of the rear wheel. The teeth of each overdrive gear exhibiting, in correspondence of a respective sector (M, N), reduced height and thickness with respect to the other teeth. The sectors (M, N) being angularly offset.

5 Claims, 11 Drawing Sheets

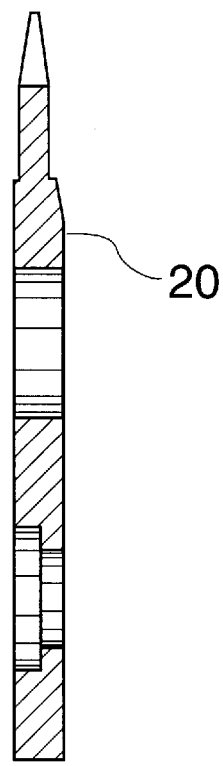
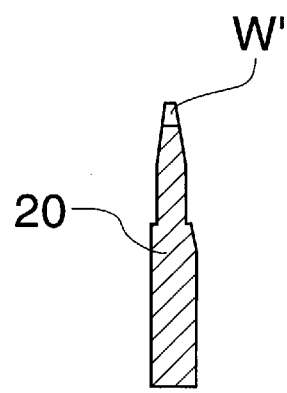
Fig. 3C            Fig. 3D
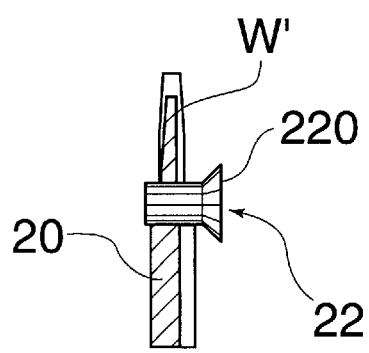
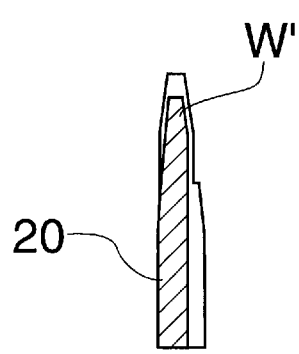
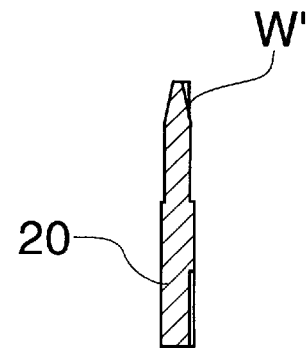
Fig. 3E            Fig. 3F            Fig. 3G

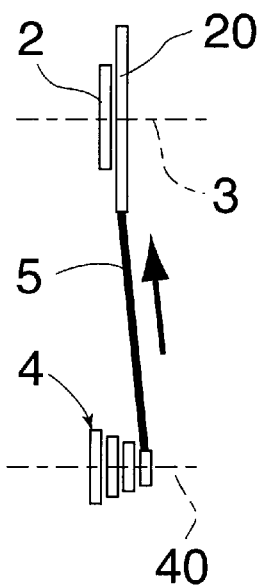
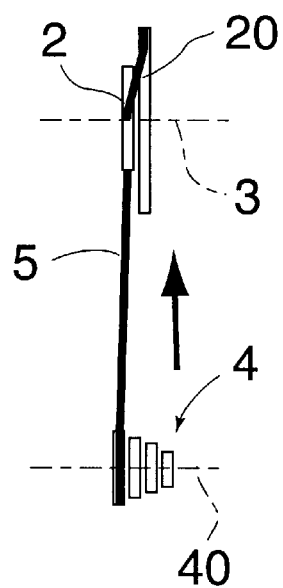
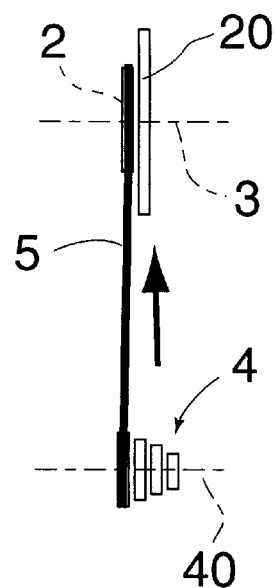
*Fig. 4C*     *Fig. 4D*     *Fig. 4E*
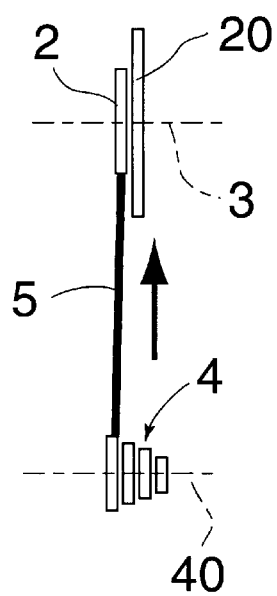
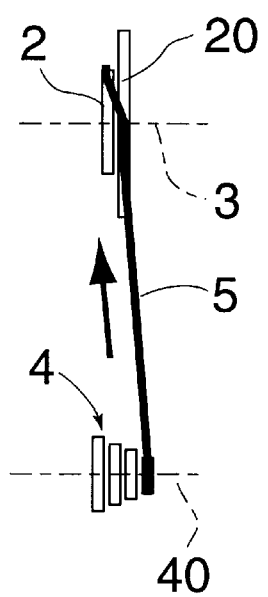
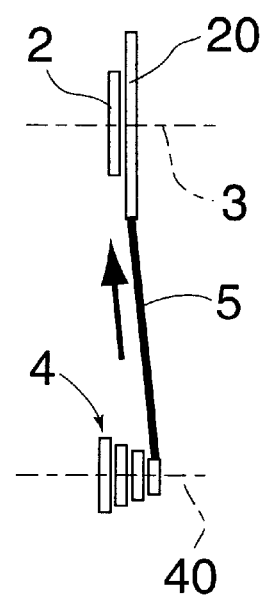
*Fig. 5G*     *Fig. 5H*     *Fig. 5I*

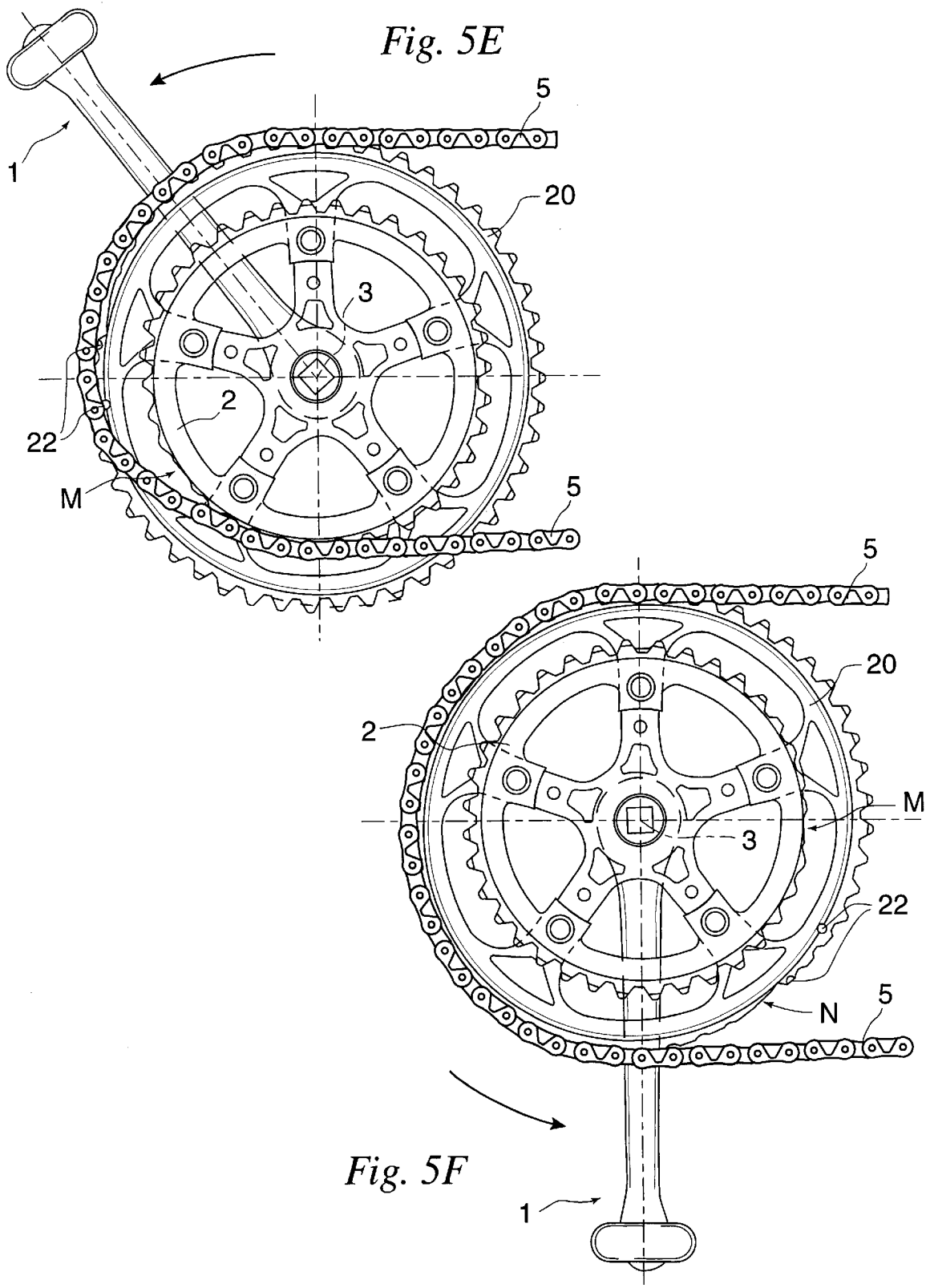

APPARATUS FOR CHANGING GEAR RATIO IN BICYCLES, ESPECIALLY IN RACE BICYCLES

The present invention refers to an improved apparatus for changing gear ratio in bicycles, especially race bicycles.

It is known that in the bicycles of simpler construction, the thrust force exerted on the pedals is transmitted to the rear wheel by two gears one of which, of larger diameter, is connected to the pedals and the other, of smaller diameter, is keyed on the shaft of the rear wheel: a roller chain being wound up over said gears. The ratio between the number of teeth of said two gears is called "overdrive or "gearing-up ratio" and indicates the number of revolutions of the rear wheel during one revolution of the pedals. The transmission may be provided with a gearshift allowing one or more ratios. In such case, the pinion of the rear wheel is connected to a plurality of sprockets having different diameter and pack-like disposed close to each other, and guide mechanism provided with a tightener that keeps the chain in tension whatever the selected ratio. The said guide mechanism, which provides for shifting the chain from one to another of the sprockets associated to the rear wheel, is operated via a driving lever and wire manually operated by the cyclist.

In some bicycle models, the transmission system above described may include two so-called overdrive gears of different diameter associated to the pedals, instead of one gear only. The transfer or "jump" of the chain from one to the other of the overdrive gears, when operating the speed ratio change, is achieved by a guide device, so-called "derailleur" consisting of a lever and a driving wire.

The presence of said derailleur device, however, means more weight, constructional and functional complexity of the transmission and a reduced mechanical efficiency of the system, also in relation of the inevitable friction deriving from the continuous contact of the chain with the derailleur—the losses due to friction being of greater amount the larger the angle of aperture of the instantaneous plane of the chain. The main object of the present invention is to overcome the said drawbacks.

Further characteristics being set forth in the dependent claims.

The advantages deriving from the present invention lie essentially in that the transmission is lighter, that the chain is subjected to a minor misalignment on the transmission gears when changing the speed ratio; that it is possible to reduce the frictions and extend the operating life of the chain; that an apparatus according to the invention is simple to make, costeffective and reliable even after a prolonged service life.

These and other advantages and characteristics of the invention will be best understood by anyone skilled in the art from a reading of the following description in conjunction with the attached drawings given as a practical exemplification of the invention, but not to be considered in a limitative sense, wherein:

FIG. 3C shows a view in section on line Z'—Z' of FIG. 3A;

FIGS. 3D–3G show a section view of FIG. 3B on line B'—B', C'—C', D'—D' and E'—E', respectively;

FIGS. 4C–4E show a schematic representation of the stages of transfer of the chain from the overdrive gear of larger diameter to the one of smaller diameter, respectively from the start, in the course and at the end of the trasnfer and, respectively, from the smaller to the larger sprocket of the rear wheel;

FIGS. 5A–5F show side views, for an observer watching the bicycle frame, of the overdrive gears during the jump of the chain from the gear of smaller diameter to the one of larger diameter;

FIGS. 5G–5I show a schematic representation of the stages of transfer of the chain from the overdrive gear of smaller diameter to the one of larger diameter, respectively from the start, in the course and at the end of the transfer and, respectively, from the larger to the smaller sprocket of the rear wheel;

Figure 1:
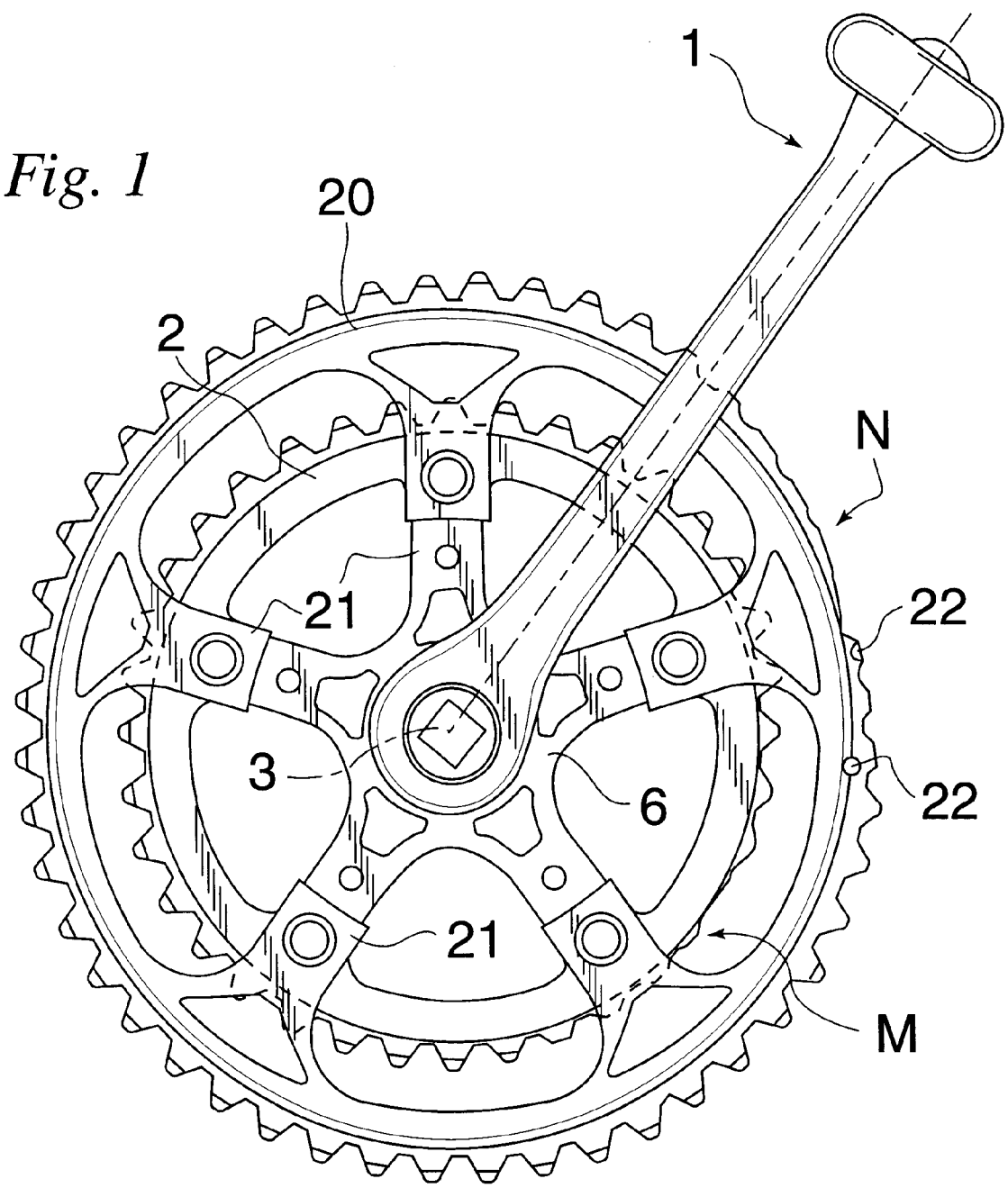
FIG. 1 shows a front view of the overdrive gears of an apparatus according to the invention.

Reduced to its basic structure, and reference being made to the figures of the attached drawings, an apparatus according to the invention comprises:

pedals (1) to the shaft (3) of which a group of coaxial overdrive gears (2, 20) is fixed;

a plurality of sprockets (4) of different diameter, pack-like disposed close to each other and mounted on the shaft (40) of the rear wheel;

a roller chain for the transmission of motion from one of the overdrive gears (2; 20) to one of the sprockets (4);

means for shifting the chain (5) from one to another of said sprockets (4), with a cyclist-operated lever-and-wire driving means (not shown in the figures of the attached drawings);

means for guiding the derailment of the chain (5) from one to the other of the overdrive gears (2; 20) in cooperation with the means for shifting the chain (5) over the sprockets (4) of the rear wheel.

In the description that follows, the gear (2) of smaller diameter will be referred to as "small overdrive gear" and the gear (20) as "large overdrive gear".

The embodiment illustrated in the figures of the attached drawings comprises two overdrive gears (2; 20) although a higher number, three for example, of them may be used as well.

Of the overdrive gears (2, 20) shown in the drawing, the larger one (20) is external, that is, facing opposite the frame element—not shown—which supports the transmission, while the smaller gear (2) is internal, that is, in an intermediate position between said frame element and the larger gear (20). The larger overdrive gear (20) is made solid to the shaft (3) of pedals (1) by means of a spider (6) whose arms are fixed to radial centripetal appendixes (21) of the same gear (20): the spider being keyed on said shaft (3). Also fixed to said appendixes (21) of the gear (20) are corresponding shorter appendixes (210) of the smaller overdrive gear (2). In this way, both gears (2, 20) result solid to the pedals shaft (3).

The said lever-and wire means associated to the group of sprockets (4) and used to command the gear ratio change are of conventional type and, therefore, will not be described in greater detail.

To transfer the chain from one to the other of overdrive gears (2, 20), when operating a particular change of gear ratio, a sector (M, N) of each of said gears (2; 20) has its toothing modified with respect to the conventional overdrive gears in which the profile, thickness and height of the teeth are constant over the whole circumference.

More particularly, said sectors (M, N) comprise teeth of height and thickness smaller than those of the remaining teeth, so as to define corresponding access and/or escape ramps or windows for the chain (5) upon the shift of the latter from one to the other of the overdrive gears (2, 20).

Said access and/or escape windows allow transferring the chain (5) from one to the other of said overdrive gears when the angle between the winding plane of the chain (5) and the plane of the concerned overdrive gear (2, 20) exceeds a preset value owing to the corresponding derailment over the rear sprockets (4). The shift of the chain from one sprocket to another of the said group of sprockets ends up in any case in correspondence of the last sprocket at one or the other end of the group. The amplitude of the angle beyond which the shift of the chain (5) from one to the other of the overdrive gears takes place depends on the shape of the teeth in correspondence of said sectors (M, N) of gears (2, 20) and on the position of the same gears on the pedals shaft (3)—with respect to the group of sprockets (4) which are mounted in corresponding fixed positions on the shaft (4) of the rear wheel—as well as on the spacing between the axis of the overdrive gears and the axis of the sprockets. The spider (6) which supports the overdrive gears (2, 20) on the pedals shaft (3) is mounted in a way allowing it to move along the axis of said shaft (3).

Figure 2A:
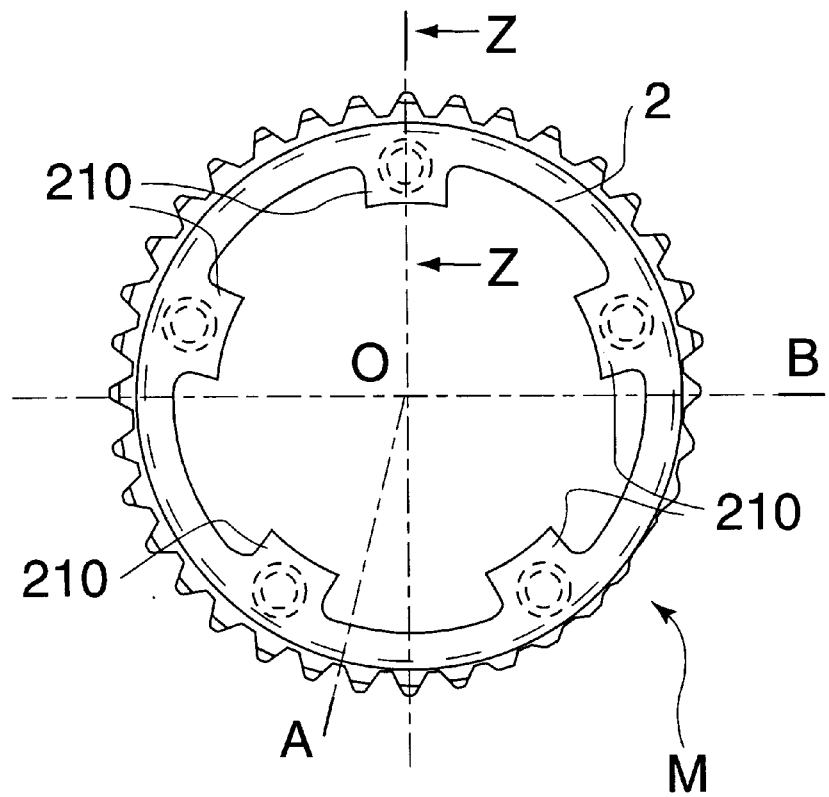
FIG. 2A is a front view showing in detail the gear of smaller diameter in the group of FIG. 1.
Figure 2B:
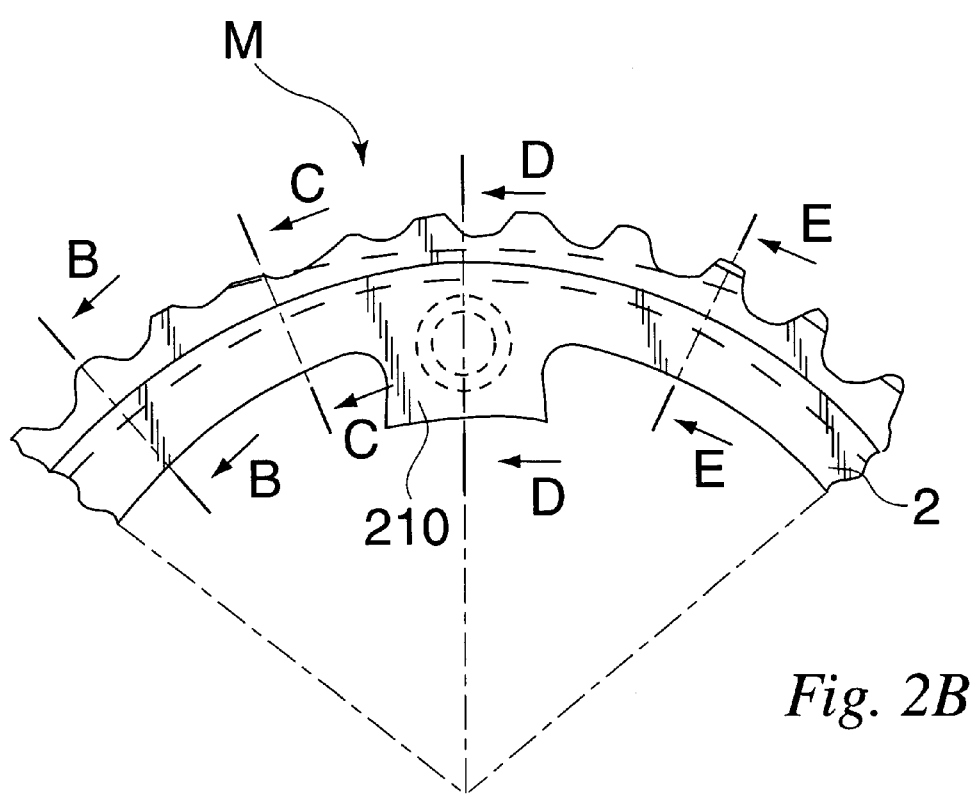
FIG. 2B shows an enlargement of the sector AOB of the gear of FIG. 2A.
Figure 2C:
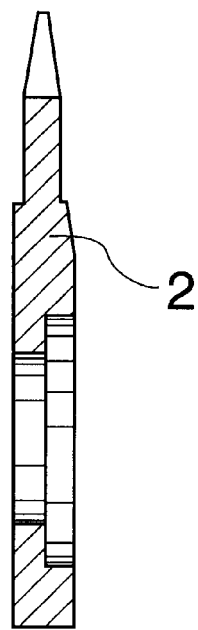
FIG. 2C shows an enlarged section view on line Z—Z of FIG. 2A.
Figure 2D:
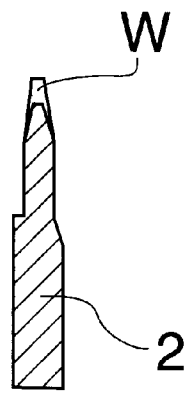
FIGS. 2D–2G show a section view on line B—B, C—C, D—D and E—E, respectively, of FIG. 2B.
Figure 2E:
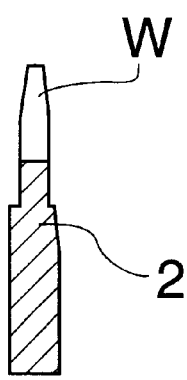
Figure 2F:
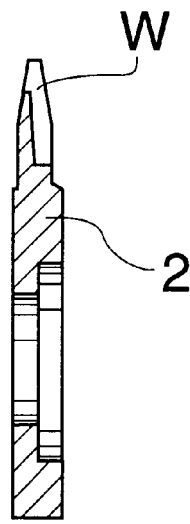
Figure 2G:
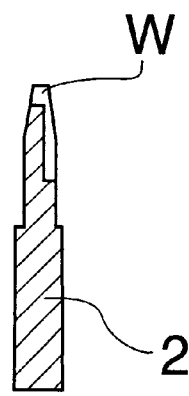
Figure 3A:
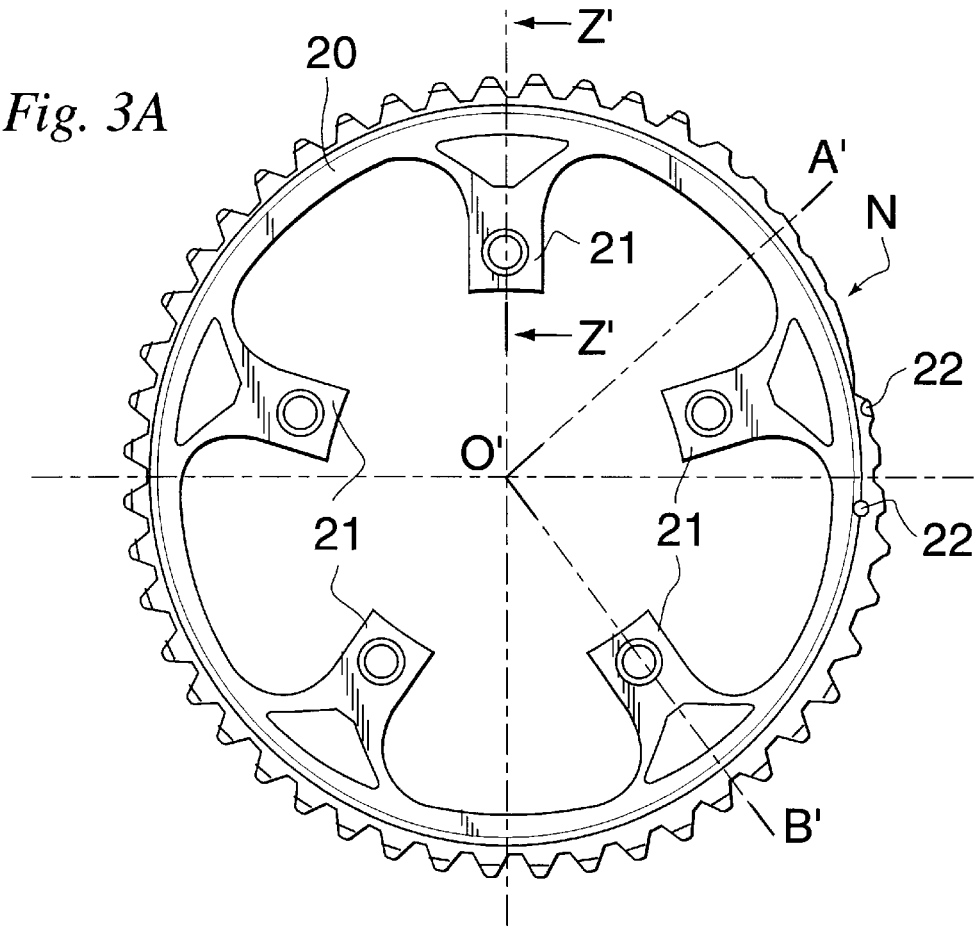
FIG. 3A shows the gear of larger diameter in the group of FIG. 1.
Figure 3B:
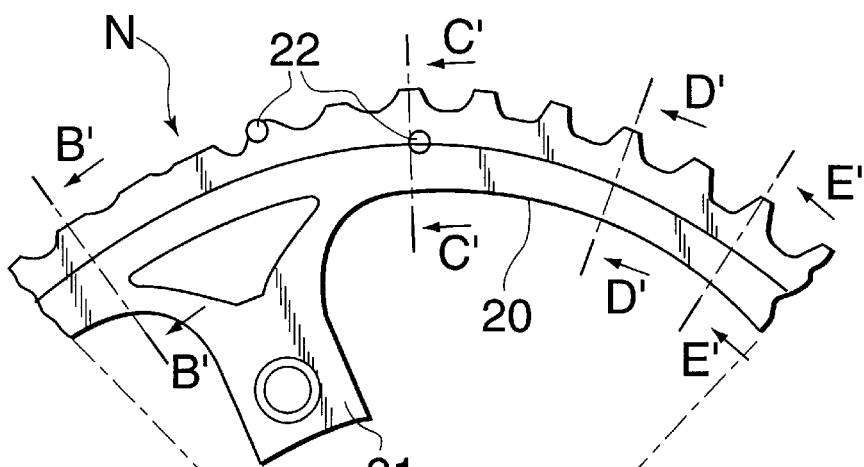
FIG. 3B is an enlargement of sector A'O'B' of FIG. 3A.

The transfer of the chain (5) onto the overdrive gears (2, 20) is made easier by the reduced meshing action exerted on the chain (5) by the teeth of the two overdrive gears in correspondence of said sectors, the latter being cascade disposed, that is, angularly offset with respect to the chain (5)—winding direction—with the sector (M) of the smaller overdrive gear (2) being upstream of that (N) of the larger one (20). In FIGS. 2D–2G and 3D–3G, the non hatched portion (W; W') of the teeth of said gears (2, 20) represents the material removed from the teeth, which are initially of constant height and thickness, of the respective sectors (M, N), so that the actual profile and thickness of the teeth in said sectors are those visible in correspondence of the hatched regions. In particular, as illustrated in FIGS. 2F and 2G of the attached drawings, the portion (W) removed from the teeth of the smaller gear (2), in the corresponding sector (M), is on the teeth side opposite to the teeth side of the larger gear (20). Moreover, the lateral surface of the overdrive gear (20) facing the smaller gear (2) is provided with a plurality of transversal, cylindrical appendixes (22), with or without a head (220), projecting perpendicularly towards the smaller gear (2) but without coming in contact therewith (the preventive reduction of the thickness of the larger gear cooperating to this purpose) and disposed according to a curve which radiuses the toothed surfaces of the two overdrive gears in correspondence of the respective sectors (M, N): the concavity of said curve facing the centre of the gears (2, 20). This makes it possible, during the rotation of the pedals and upon changing overdrive gear, for the chain (5) to raise from the smaller overdrive gear (2) up to the larger one (20) as far as to result fully wound around the latter.

The cylindrical appendixes (22) can be placed on the overdrive gear (20) in the points destined to engage with the joint pins of the roller chains (5). This feature may allow an ever better engagement between the appendixes (22) and roller chain portions having the same width, that is the width of said joint pins. Advantageously, according to the invention, on the bicycle frame at the height of the pedals shaft (3), a fin is mounted (not shown for the sake of clarity in the figures of the attached drawings) making up an abutting element for the chain upon the lowering thereof from the larger overdrive gear to the smaller one, thereby preventing the same chain from passing over it. In the same way, fixed to the pedal arm or crank adjacent to the overdrive gears, is a fin for retaining the chain upon the raising thereof over the the larger overdrive gear.

Moreover, advantageously, according to the invention, provision is made for said modifed sectors (M, N) of the overdrive gears to be positioned so that the transfer of the chain from one to the other overdrive gears will start with the pedal arm or crank being in vertical position, that is, with the relevant pedal in its respective top dead center.

Figure 4A:
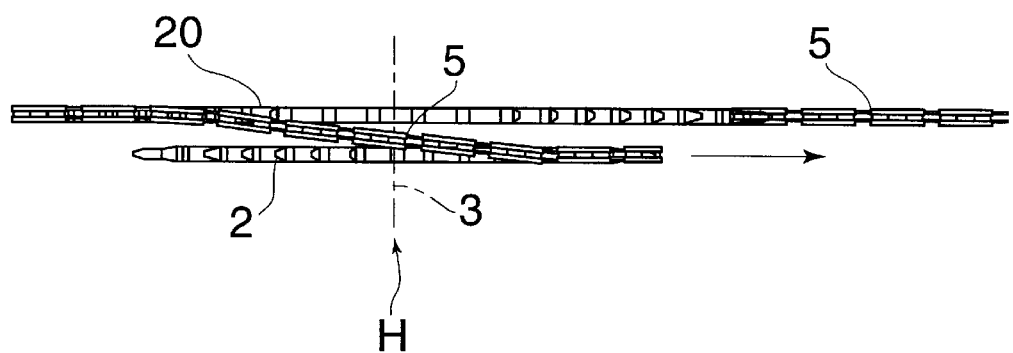
FIG. 4A shows a plan view of the overdrive gears during the chain's derailment from the gear of larger diameter to the one of smaller diameter.
Figure 4B:
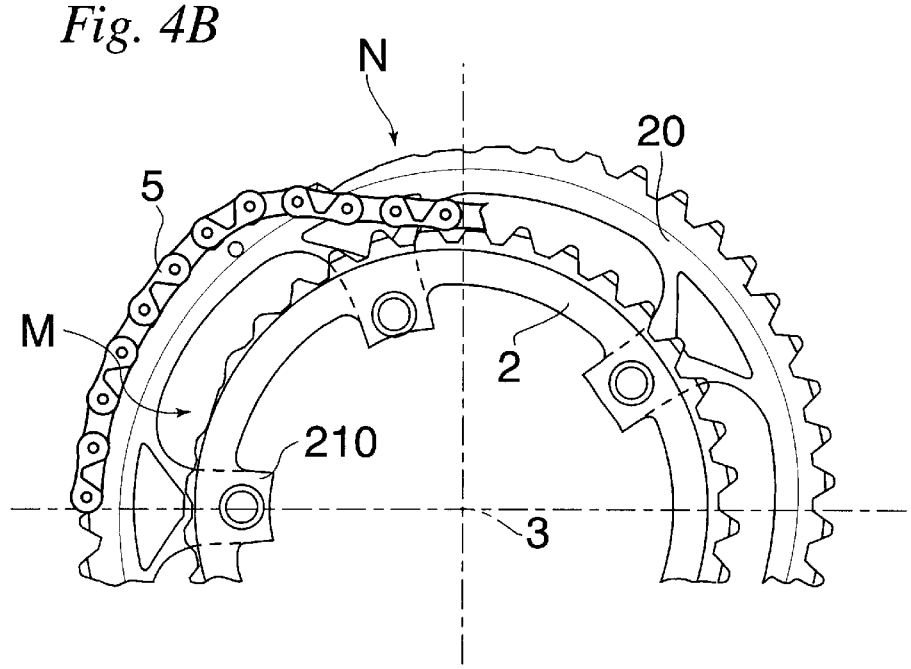
FIG. 4B shows a side view from H of the gears of FIG. 4A.
Figure 5A:
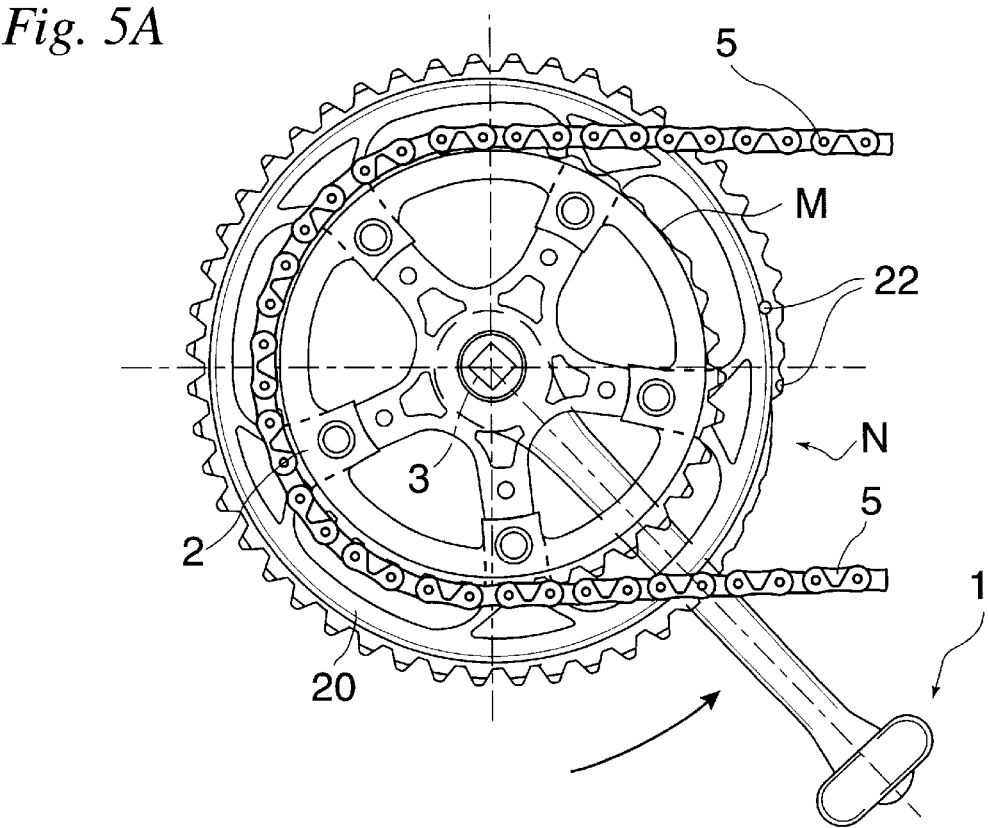
Figure 5B:
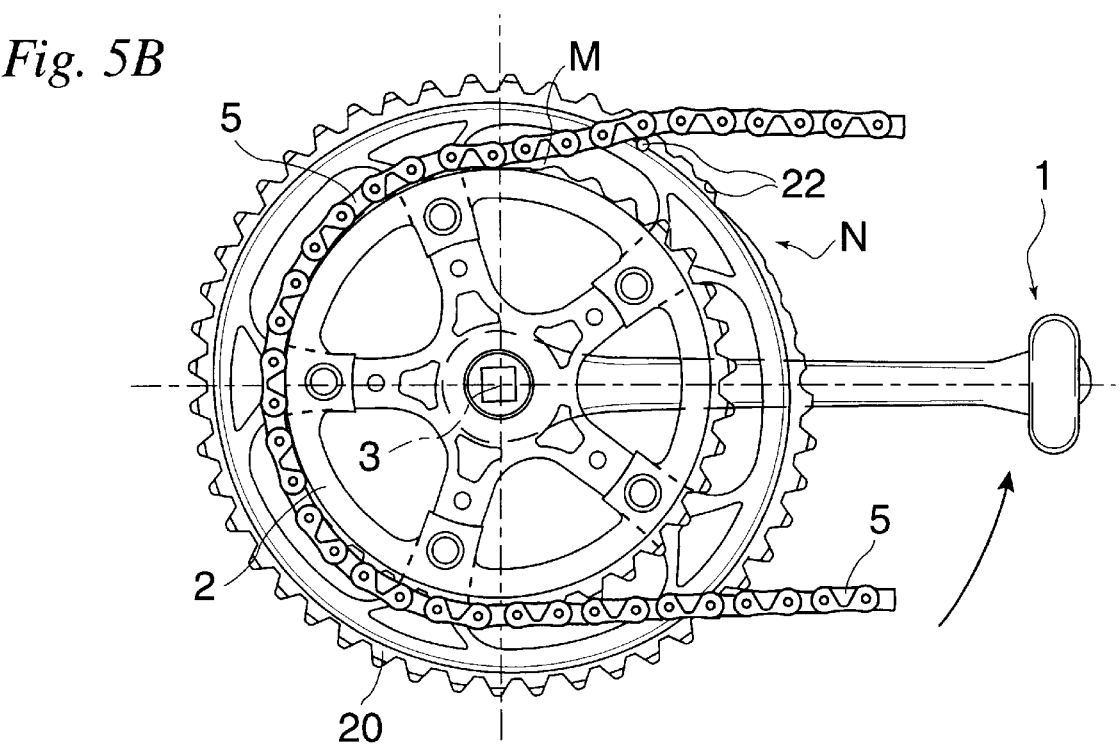
Figure 5C:
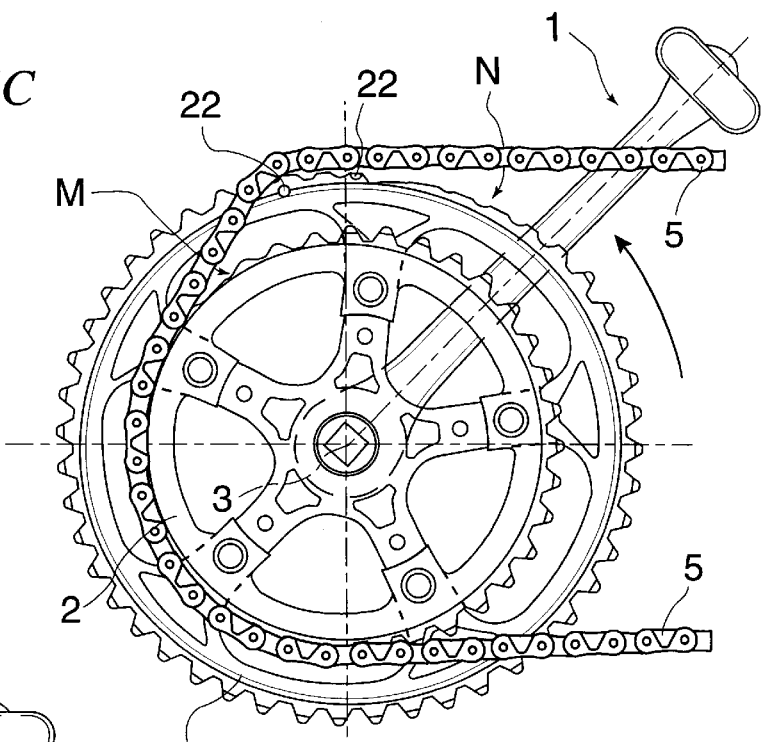
Figure 5D:
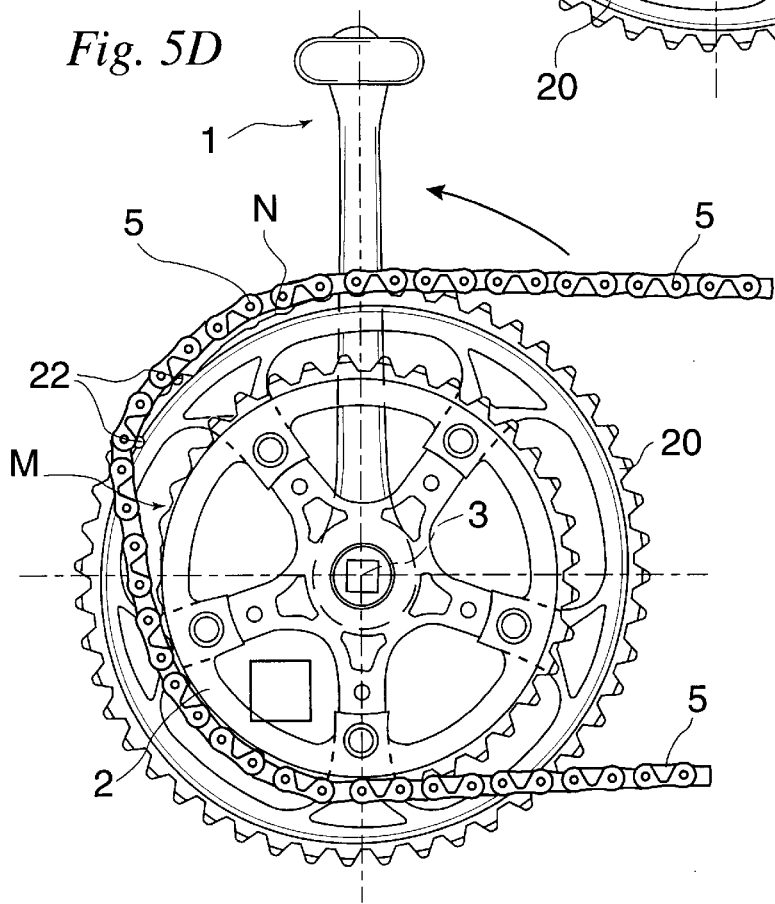

With reference to FIGS. 4A–4C of the attached drawings, the operation of the apparatus in case of the transfer of chain (5) from the larger overdrive gear (20) to the smaller one (2) is as follows.

Because of the shift of the chain (5) to the left hand side over the sprockets (4), as shown in FIGS. 4C–4E, as a consequence of a gearing-down command by the cyclist, the angle formed by the plane of the chain (5) with the plane of the larger overdrive gear (20) takes up such a value that the links of the chain (5) come out of meshing engagement with the teeth of the respective sector (N), which are of reduced thickness, and come down over the smaller overdrive gear (2) to engage the teeth of the corresponding sector (M) and, therefore, to keep running over the smaller gear (2) until a reverse command is given as described below. With reference to FIGS. 5A–5F of the attached drawings, the operation of the apparatus in case of the transfer of chain (5) from the smaller overdrive gear (2) to the larger one (20) is as follows.

Because of the shift of the chain (5) to the right hand side over the sprockets (4), as shown in FIGS. 5G–5I, as a consequence of a gearing-up command by the cyclist, the angle formed by the plane of the chain (5) with the plane of the smaller overdrive gear (2) takes up such a value that the links of the chain (5) come out of meshing engagement with the teeth of the respective sector (M) and move towards the larger overdrive gear (20) by linking themselves with the side appendixes (22) thereof, to become engaged with the corresponding sector (N) and, thereby, to keep running over the larger gear (20).

Figure 6A:
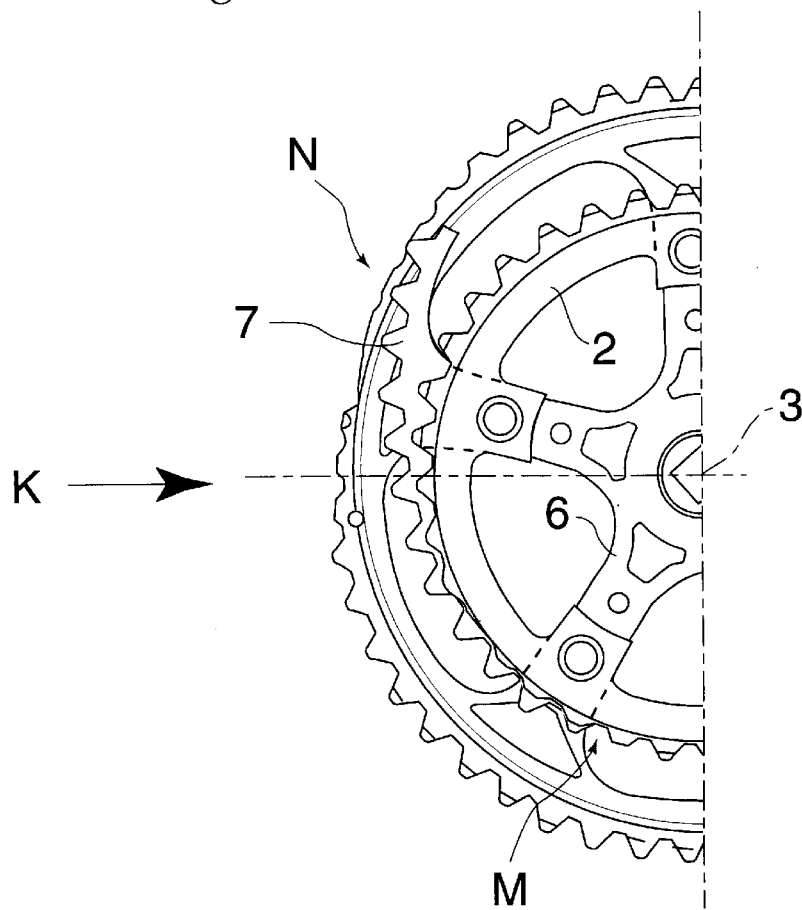
FIG. 6A shows the overdrive gears of a further embodiment of the apparatus according to the invention.
Figure 6B:
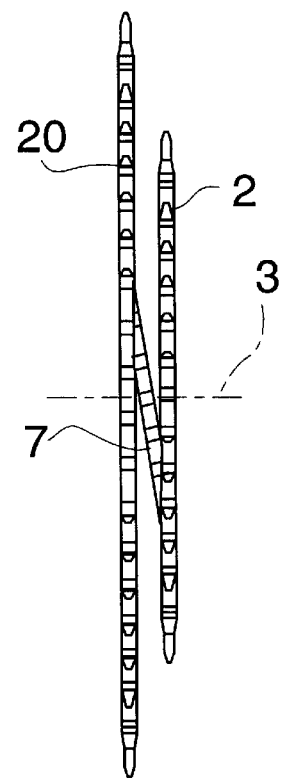
FIG. 6B shows the group of FIG. 6A as viewed from K.

According to a further embodiment, reference being made to FIGS. 6A and 6B of the attached drawings, in order to guide the transfer of the chain (5) from one to the other of the two overdrive gears (2, 20) when the cyclist operates the gear ratio change, a flat body is provided having outer toothing apt to engage the links of the chain (5), which body connects the said gears (2, 20) in correspondence of the sectors (M, N) which provide the reduced meshing action defined above and whose ends are solid to both the overdrive gears (2, 20). In FIG. 6B, the body (7) is inclined to the left hand side, the overdrive gears being represented as viewed from the front side of the bicycle. When the chain (5) fleets over the rear sprockets (4) because of the gear ratio change operated by the cyclist, the angle formed by its plane with respect to that of the concerned overdrive gear, takes up such a value that the links, no longer in meshing engagement on the teeth of said sectors of the overdrive gears, shift towards the body (7) and, since the latter connects the two gears, there is obtained the lowering, respectively, the lifting of the chain (5) from the larger, respectively smaller gear to the smaller, respectivelly, larger gear. In case the overdrive gears are more than two, for example in number of three, provision is made for a body (7) between each pair of adjacent overdrive gears. The central overdrive gear will then result modified likewise the larger one in the case of two overdrive gears.

The suppression, according to the present invention, of the chain-derailment lever used in the traditional bicycles, allows reducing the weight of the system and eliminating all the frictions due to its contact with the chain. This involves either an increased speed with motive power and general running conditions being equal, or a reduced effort with equal speed, which results particularly advantageous to runners or cyclists riding long distances.

Practically, all the construction details may vary in any equivalent way as far as the shape, dimensions, elements disposition, nature of the used materials are concerned, without nevertheless departing from the scope of the adopted solution idea and, thereby, remaining within the limits of the protection granted to the present patent for industrial invention.

We claim:

1. Apparatus for changing bicycle gear ratio comprising pedals (1) to a first shaft (3) of which a group of coaxial overdrive gears is fixed, with at least an overdrive gear (20) of larger diameter and at least an overdrive gear (2) of smaller diameter; a plurality of sprockets (4) of different diameter, pack-like disposed close to each other and mounted on a second shaft (40) of a rear wheel; a roller chain for the transmission of motion from one of the overdrive gears (2; 20) to one of the sprockets (4); means for shifting the chain (5) from one to another of said sprockets (4), with a cyclist-operated lever-and-wire driving means for driving said means for shifting the chain; and means for guiding the deviation of the chain (5) from one to the other of the overdrive gears (2; 20) in cooperation with the means for shifting the chain (5) over the sprockets (4) of the rear wheel, characterized in that teeth of each overdrive gear exhibit, in correspondence of a respective sector (M, N), reduced height and thickness with respect to other teeth, said sectors (M, N) being angularly offset and cascade disposed with respect to the direction of rotation of the overdrive gears and with the sector (N) of said at least one overdrive gear (20) of larger diameter being moved forward with respect to that (N) of said at least one overdrive gear (2) of smaller diameter, and in that between each pair of overdrive gears are disposed solid to the larger gear of the pair and fixed thereto, in order to guide the deviation of the chain (5) from the smaller overdrive gear to the larger one.

2. Apparatus according to claim 1 characterized in that said overdrive gears are in number of two or three.

3. Apparatus according to claim 1 characterized in that said guide means for shifting the chain from the larger overdrive gear to the smaller one comprise a plurality of appendixes (22) solid to the side wall of the larger gear, projecting perpendicularly towards the opposite side portion of the smaller gear but without coming in contact therewith; said appendixes being disposed according to a curve which radiuses the toothed surfaces of the two overdrive gears in correspondence of the respective sectors (M, N) having teeth of reduced height and thickness.

4. Apparatus according to claim 1, wherein said appendixes (22) are cylindrical, with or without head.

5. Apparatus according to claim 1, wherein said guide means for shifting the chain from the larger overdrive gear to the smaller one comprise a flat body (7) having outer toothing apt to engage the links of the chain (5), which body connects the said gears (2, 20) in correspondence of the sectors (M, N) with teeth of reduced height and/or thickness: said body being solid to both the gears of each pair of overdrive gears.

* * * * *